United States Patent
Minamizaki

[11] Patent Number: 6,030,662
[45] Date of Patent: Feb. 29, 2000

[54] TREATMENT METHOD FOR SURFACE ENERGY REDUCTION

[75] Inventor: Yoshihiro Minamizaki, Ibaraki, Japan

[73] Assignee: Nitto Denko Corporation, Osaka, Japan

[21] Appl. No.: 09/129,036

[22] Filed: Aug. 4, 1998

[30] Foreign Application Priority Data

Aug. 5, 1997 [JP] Japan ................................ 9-211038

[51] Int. Cl.$^7$ ............................... B05D 5/00; B05D 3/00
[52] U.S. Cl. ........................... 427/333; 427/399; 427/400
[58] Field of Search .................................. 427/399, 400, 427/333

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 5,531,813 | 7/1996 | Henry et al. | 106/2 |
| 5,633,328 | 5/1997 | Tsujinaka et al. | 524/589 |
| 5,876,753 | 3/1999 | Timmons et al. | 427/488 |

*Primary Examiner*—Shrive Beck
*Assistant Examiner*—Jennifer Calcagni
*Attorney, Agent, or Firm*—Sughrue, Mion, Zinn, Macpeak & Seas, PLLC

[57] ABSTRACT

A treatment method for surface energy reduction is disclosed, which comprises subjecting a substrate to an interfacial contact reaction between the phase thereof and a phase containing a compound having at least one low-energy functional group to fix the low-energy functional groups to the substrate surface to thereby reduce the surface energy thereof. The method necessitates neither an expensive special solvent nor a curing step causing mechanical damage to the substrate, and can be carried out under simple conditions.

3 Claims, No Drawings

TREATMENT METHOD FOR SURFACE ENERGY REDUCTION

FIELD OF THE INVENTION

The present invention relates to a treatment method for surface energy reduction by which a low-energy surface excellent in release property, water repellency, oil repellency, etc. can be easily obtained.

BACKGROUND OF THE INVENTION

An industrially extensively employed technique for imparting functions such as release properties, water repellency, and oil repellency to substrates such as polymer films, polymer sheets, polymer moldings, and coating films is to treat surfaces of these substrates to reduce the surface energy thereof.

For example, in pressure-sensitive adhesive tapes and pressure-sensitive adhesive sheets, a release agent containing low-energy functional groups such as long-chain alkyl groups, perfluoro groups, or polydimethylsiloxane groups is applied to the tape or sheet substrate on its back surface which comes into contact with a pressure-sensitive adhesive or to a separator to thereby reduce the surface energy thereof for the purpose of protecting the pressure-sensitive adhesive surface until use and facilitating the unwinding or release of the pressure-sensitive adhesive tape or sheet at the time of use.

Also in the case of films, sheets, moldings, coating films, and the like which are required to have water repellency and oil repellency, the surface energy thereof is reduced by applying a water and oil repellent containing low-energy functional groups such as long-chain alkyl groups, perfluoro groups, or polydimethylsiloxane groups to the substrate surface or incorporating the water and oil repellent into the substrate.

In order to obtain a durable low-energy surface by these treatment methods for surface energy reduction, it is necessary to use a polymeric material, i.e., polymer, having low-energy functional groups as the release agent or as the water and oil repellent. Where an especially high degree of durability is desired, a technique is generally employed to form a layer of a polymer containing low-energy functional groups on a surface of a base and then cure the polymer layer through a crosslinking reaction.

However, in the conventional technique using a polymer containing low-energy functional groups, the polymer is diluted with a solvent to prepare a treating liquid and this treating liquid is applied to a substrate surface and heated to volatilize the solvent to thereby form a thin polymer layer. This technique has the following disadvantages. When the polymer used is a polymer poorly soluble in general solvents, e.g., a polymer containing perfluoro groups, it is necessary to use an expensive fluorochemical solvent. When the polymer used contains long-chain alkyl groups, use of a heated solvent and much time for dissolution are necessary.

Where a thin polymer layer is formed and then crosslinked through a crosslinking reaction by heating the same at high temperature or irradiating the same with a radiation such as electron beams or ultraviolet, this technique not only is disadvantageous in procedure and cost, but has a drawback that the film, sheet, or other substrate is apt to suffer mechanical damage, e.g., thermal deformation.

SUMMARY OF THE INVENTION

Under these circumstances, an object of the present invention is to provide a treatment method for surface energy reduction which necessitates neither an expensive special solvent nor a curing step causing mechanical damage to the substrate and can be carried out under simpler conditions.

The present inventors made intensive studies in order to accomplish the above object. As a result, they have found that when a substrate phase is subjected to an interfacial contact reaction with a phase containing a compound having one or more low-energy functional groups to thereby fix the low-energy functional groups to the substrate surface, it is possible to easily form, on the substrate surface, a durable layer having a low surface energy without necessitating an expensive special solvent nor requiring a curing step causing mechanical damage to the substrate, unlike the conventional techniques described above. The present invention has been completed based on this finding.

The present invention provides a treatment method for surface energy reduction which comprises subjecting a substrate to an interfacial contact reaction between the phase thereof and a phase containing a compound having at least one low-energy functional group to thereby reduce the surface energy of the substrate surface.

The present invention can further provide:

the treatment method for surface energy reduction described above wherein the interfacial contact reaction occurs between a compound contained in the substrate phase and having at least one reactive functional group and a compound having at least one low-energy functional group and at least one reactive functional group which reacts with the functional group in the substrate phase;

the treatment method for surface energy reduction described above wherein the interfacial contact reaction is an interfacial contact reaction between a reactive intermediate layer formed beforehand on the substrate surface and the phase containing a compound having at least one low-energy functional group;

the treatment method for surface energy reduction described above wherein the low-energy functional group is at least one member selected from the group consisting of long-chain alkyl groups having 12 or more carbon atoms, perfluoro groups, and polydimethylsiloxane groups; and the treatment method for surface energy reduction described above wherein the interfacial contact reaction is a reaction between amino groups and isocyanate, acid chloride, epoxy, vinyl, or acid anhydride groups.

DETAILED DESCRIPTION OF THE INVENTION

Examples of the substrate for use in the present invention include polymer films, polymer sheets, polymer moldings, coating films, papers, cloths, inorganic substances such as metals, and composite materials of these. The interfacial contact reaction between a substrate phase and a phase containing a compound containing at least one low-energy functional group in the treatment method for surface energy reduction of the present invention is usually an interfacial contact reaction between a solid or liquid phase comprising a substrate such as those enumerated above and a liquid or gaseous phase containing a compound having at least one low-energy functional group. As a result of this interfacial contact reaction, low-energy functional groups are fixed to the substrate surface to thereby reduce the surface energy of the substrate surface.

When a liquid phase containing a compound having at least one low-energy functional group is subjected to the interfacial contact reaction, it is preferred to use dipping or immersion. However, it is also possible to use a method in which the liquid is applied with a kiss-roll coater, roll coater, squeeze coater, spin coater, or the like, and the excess adherent liquid applied is washed away. When a gaseous phase containing a compound having at least one low-energy functional group is subjected to the interfacial contact reaction, this reaction may be conducted by introducing a substrate (solid or liquid phase) such as those enumerated above into a chamber in which the compound having at least one low-energy functional group is present as a gas.

Where such a method is used for fixing low-energy functional groups to a substrate surface in a high density, it is undesirable to conduct the interfacial contact reaction in such a manner as to melt or considerably swell the substrate surface. It is therefore desirable to select an appropriate solvent for use in the liquid phase containing a compound having at least one low-energy functional group. Since this compound need not be a polymer such as conventional treatments, an appropriate solvent therefor can be suitably selected from general solvents. In the case of using a gaseous phase, it is desirable to select a compound having one or more low-energy functional groups which is suitable for use as the gas.

In order to use an interfacial contact reaction for fixing low-energy functional groups to a substrate surface in the present invention, the reaction may be conducted between a compound having at least one reactive functional group which is contained in the substrate phase and a compound having at least one low-energy functional group and at least one reactive functional group which reacts with the functional group in the substrate phase. As a result of this reaction, the compound having at least one low-energy functional group is tenaciously bonded to the substrate surface with chemical bonds such as covalent, coordinate, hydrogen, ionic, or metallic bonds.

Such an interfacial contact reaction preferably proceeds and terminates in a short period of time. From this standpoint, the reaction of reactive functional groups in the substrate phase with reactive functional groups in the phase containing a compound having at least one low-energy functional group is preferably a reaction between primary or secondary amino groups and isocyanate, acid chloride, epoxy, vinyl, or acid anhydride groups. Other preferred examples thereof include a reaction between carboxyl groups and aziridine groups, a reaction between hydrosilyl groups and vinyl or hydroxyl groups, a reaction between epoxy groups and acid anhydride groups, and a reaction between acid chloride groups and hydroxyl or mercapto groups.

For carrying out such an interfacial contact reaction, a compound having at least one reactive functional group is incorporated into the substrate phase. This incorporation may be accomplished, for example, by using a substrate made of a polymer to which at least one reactive functional group per molecule has been bonded beforehand, or by adding a compound having at least one reactive functional group such as those enumerated above to a base beforehand. It is also possible to form a thin layer of a compound having at least one reactive functional group such as those enumerated above on a substrate surface by a coating technique for dilute solutions or by a coating technique using a squeeze coater, a spin coater, or the like.

The compound having at least one low-energy functional group is a compound which has, per molecule, one or more reactive functional groups reacting with the functional groups in the substrate and further has at least one long-chain alkyl group having 12 or more carbon atoms, perfluoro group, or polydimethylsiloxane group (or a group formed by partly substituting any of these groups) as a low-energy functional group. As stated hereinabove, this compound need not be a polymer such as conventional treatments and may have a relatively low molecular weight. Consequently, a solution of the compound in an appropriate general solvent may be subjected to the interfacial contact reaction. If the compound used is highly volatile, this compound in a gas state can be subjected to the interfacial contact reaction.

In the present invention, it is also possible to fix low-energy functional groups to a surface of a substrate by forming a reactive intermediate layer on the substrate surface beforehand and causing the intermediate layer to undergo an interfacial contact reaction with a phase containing a compound having at least one low-energy functional group. For forming the reactive intermediate layer on a substrate surface, another interfacial contact reaction may be conducted.

For example, a substrate having isocyanate groups on the surface thereof is caused to undergo an interfacial contact reaction with an aqueous polyallylamine solution to form urea bonds through the reaction of isocyanate groups with primary amino groups to thereby fix the polyallylamine to the substrate surface. Thus, primary amino groups are incorporated on the substrate surface to constitute a reactive intermediate layer. Thereafter, a compound having at least one low-energy functional group and further having at least one functional group reactive with the amino groups is subjected to an interfacial contact reaction for which the high reactivity of the intermediate layer is utilized. Thus, low-energy functional groups can be incorporated and fixed to the substrate surface in a high concentration.

The present invention will be explained below in more detail by reference to Examples thereof, but the invention should not be construed as being limited thereto. In the following Comparative Examples and Examples, a polyester film having a thickness of 25 $\mu$m was used as a substrate to be subjected to a treatment for surface energy reduction.

COMPARATIVE EXAMPLE 1

0.168 g of "Peeloyl 1010S", which is a solid long-chain-alkyl polymer release agent manufactured by Ipposha Oil Industries Co., Ltd., was dissolved in 100 ml of n-hexane or toluene at room temperature (e.g., 20–25° C.). However, it was impossible to completely dissolve the release agent in either of the solvents even after three days. Hence, 100 ml of toluene heated to 80° C. was used to dissolve the release agent therein by stirring for about 6 hours. The resulting solution was applied to the substrate with a No. 26 mayer bar at a dry coating thickness of 0.1 $\mu$m. However, when the solution was applied without heating the mayer bar and the substrate to about 40° C. or higher beforehand, the polymer coated partially agglomerated on the substrate surface during solvent volatilization to thereby cause an uneven coating surface.

COMPARATIVE EXAMPLE 2

0.274 g on a solid basis of "X-70-029B", which is a perfluoro polymer release agent manufactured by Shin-Etsu Chemical Co., Ltd., was dissolved in 100 ml of toluene or hexane. However, polymer sedimentation occurred in either of the solvents. Hence, the release agent was dissolved in 100 ml of "FR Thinner", which is a fluorochemical solvent manufactured by Shin-Etsu Chemical Co., Ltd. Thereto was added a given amount of "DF29", which is a curing catalyst. This solution was applied to the substrate with a No. 16 mayer bar at a dry coating thickness of 0.1 μm. After the application, the solvent "FR Thinner" was volatilized. However, the polymer coating film obtained had insufficient cohesive strength and poor frictional durability. The coated substrate was placed in a 140° C. heating oven for 20 minutes to cure the polymer coating film. As a result, a large wavy deformation occurred in the polyester film base due to the heating.

COMPARATIVE EXAMPLE 3

In 100 ml of hexane was dissolved 0.274 g on a solid basis of "X-62-2555", which is a polydimethylsiloxane polymer release agent manufactured by Shin-Etsu Chemical Co., Ltd. Thereto was added a given amount of "PL50T", which is a curing catalyst. This solution was applied to the substrate with a No. 16 mayer bar at a dry coating thickness of 0.1 μm. After the application, the hexane as the solvent was volatilized. However, the polymer coating film obtained had insufficient cohesive strength and poor frictional durability. The coated substrate was placed in a 100° C. heating oven for 5 minutes to cure the polymer coating film. As a result, a slight wavy deformation occurred in the polyester film substrate due to the heating.

EXAMPLE 1

In 73.2 ml of ethyl acetate were dissolved 1.70 g of "New-Pol PP-4000", which is a polypropylene glycol manufactured by Sanyo Chemical Industries, Ltd., and 0.40 g of "Coronate L", which is a 75% ethyl acetate solution of the adduct of 1 mol of trimethylolpropane with 3 mol of 2,4-tolylene diisocyanate and is a product of Nippon Polyurethane Co., Ltd. Thereto was added, as a curing catalyst, 0.009 g of di-n-butyltin dilaurate manufactured by Kishida Chemical Co., Ltd. The molar ratio of the hydroxyl groups of the polypropylene glycol in the resultant system to the isocyanate groups of the adduct was calculated at 1:1.5. The solution thus prepared was applied to the substrate with a No. 16 mayer bar at a dry coating thickness of 1 μm, and then air-dried at room temperature.

Within one day from the production of the coated sample, it was immersed in a solution prepared by dissolving 0.20 g on a solid basis of "PAA-10C", which is a polyallylamine manufactured by Nitto Boseki Co., Ltd., in 1,000 ml of pure water, and then taken out therefrom at a rate of 4 cm/min to thereby fix the polyallylamine to the coated sample. Thus, a reactive intermediate layer was obtained. Subsequently, the coated sample having the reactive intermediate layer was immersed for 30 minutes in a solution prepared by dissolving 1.0 g of stearoyl chloride manufactured by Wako Pure Chemical Industries, Ltd. in 1,000 ml of n-hexane to cause the intermediate layer to undergo an interfacial contact reaction. Thereafter, the coated sample was taken out of the solution and rinsed with n-hexane. Thus, a polyester film which had undergone a surface energy reducing treatment with long-chain alkyl groups was obtained. The stearoyl chloride used above readily dissolved in n-hexane.

EXAMPLE 2

A polyester film which had undergone a surface energy reducing treatment with long-chain alkyl groups was obtained in the same manner as in Example 1, except that octadecyl isocyanate manufactured by Aldrich Chemical Company was used in place of stearoyl chloride to conduct an interfacial contact reaction. The octadecyl isocyanate used above readily dissolved in n-hexane.

EXAMPLE 3

A polyester film which had undergone a surface energy reducing treatment with perfluoro groups was obtained in the same manner as in Example 1, except that perfluorooctanoyl chloride manufactured by Lancaster Synthesis was used in place of stearoyl chloride to conduct an interfacial contact reaction. The perfluorooctanoyl chloride used above readily dissolved in n-hexane.

EXAMPLE 4

A polyester film which had undergone a surface energy reducing treatment with perfluoro groups was obtained in the same manner as in Example 1, except that perfluorohexylethylene manufactured by Tokyo Kasei Kogyo Co, Ltd. was used in place of stearoyl chloride to conduct an interfacial contact reaction. The perfluorohexylethylene used above readily dissolved in n-hexane.

EXAMPLE 5

A polyester film which had undergone a surface energy reducing treatment with polydimethylsiloxane groups was obtained in the same manner as in Example 1, except that "X-22-173DX", which is a polydimethylsiloxane terminated at one end by an epoxy group (molecular weight: 4,500) manufactured by Shin-Etsu Chemical Co., Ltd., was used in place of stearoyl chloride to conduct an interfacial contact reaction. The polydimethylsiloxane terminated at one end by an epoxy group used above, i.e., "X-22-173DX", readily dissolved in n-hexane.

EXAMPLE 6

A coated sample having a reactive intermediate layer formed by fixing a polyallylamine in the same manner as in Example 1 was applied to an inner wall of a 3,000 ml glass beaker in such a manner that the intermediate layer was exposed. A glass dish on which 1 g of perfluorooctanoyl chloride was placed was put on the bottom of the beaker, and the beaker was wholly sealed with a saran wrap film. This sealed beaker was placed in a 50° C. heating oven for 30 minutes. Thereafter, the coated sample was taken out of the beaker and rinsed with n-hexane. Thus, a polyester film which had undergone a surface energy reducing treatment with perfluoro groups was obtained.

EXAMPLE 7

In 73.2 ml of ethyl acetate was dissolved 0.27 g of "Coronate L", which is a 75% ethyl acetate solution of the adduct of 1 mol of trimethylolpropane with 3 mol of 2,4-tolylene diisocyanate and is a product of Nippon Polyurethane Co., Ltd. This solution was applied to the substrate with a No. 16 mayer bar at a dry coating thickness of 0.1 μm, and then air-dried at room temperature. Within one day from the production of the coated sample, it was immersed in a solution prepared by dissolving 0.20 g on a solid basis of "PAA-10C", which is a polyallylamine manufactured by Nitto Boseki Co., Ltd., in 1,000 ml of pure water, and then taken out therefrom at a rate of 4 cm/min to thereby fix the polyallylamine to the coated sample. Thus, a reactive intermediate layer was obtained. Subsequently, the coated sample having the reactive intermediate layer was immersed for 30 minutes in a solution prepared by dissolving 1.0 g of stearoyl chloride manufactured by Wako Pure Chemical Industries, Ltd. in 1,000 ml of n-hexane to cause the intermediate layer to undergo an interfacial contact reaction. Thereafter, the coated sample was taken out of the solution and rinsed with n-hexane. Thus, a polyester film which had undergone a surface energy reducing treatment with long-chain alkyl groups was obtained.

EXAMPLE 8

In 73.2 ml of ethyl acetate was dissolved 0.27 g of "Coronate L", which is a 75% ethyl acetate solution of the adduct of 1 mol of trimethylolpropane with 3 mol of 2,4-tolylene diisocyanate and is a product of Nippon Polyurethane Co., Ltd. This solution was applied to the substrate with a No. 16 mayer bar at a dry coating thickness of 0.1 μm, and then air-dried at room temperature. At three days after the production of the coated sample, it was immersed for 30 minutes in a solution prepared by dissolving 1.0 g of stearylamine manufactured by Wako Pure Chemical Industries, Ltd. in 1,000 ml of n-hexane to cause the coated sample to undergo an interfacial contact reaction. Thereafter, the coated sample was taken out of the solution and rinsed with n-hexane. Thus, a polyester film which had undergone a surface energy reducing treatment with long-chain alkyl groups was obtained. The stearylamine used above readily dissolved in n-hexane.

EXAMPLE 9

In 73.2 ml of pure water was dissolved 0.2 g on a solid basis of "PAA-10C", which is a polyallylamine manufactured by Nitto Boseki Co., Ltd. This solution was applied to the substrate with a No. 16 mayer bar at a dry coating thickness of 0.1 μm, and then air-dried at room temperature. The resulting coated sample was immersed for 30 minutes in a solution prepared by dissolving 1.0 g of stearoyl chloride manufactured by Wako Pure Chemical Industries, Ltd. in 1,000 ml of n-hexane to conduct an interfacial contact reaction. Thereafter, the coated sample was taken out of the solution and rinsed with n-hexane. Thus, a polyester film which had undergone a surface energy reducing treatment with long-chain alkyl groups was obtained.

In each of the polyester films which had undergone surface energy reducing treatments obtained in Examples 1 to 9, the treated surface had sufficient frictional durability. Furthermore, in each treated film, the polyester film substrate had no decrease in strength and, in particular, had suffered no mechanical damage such as deformation. For the purpose of evaluating the degree of surface energy reduction of each treated surface, the surface tension thereof was calculated based on a contact angle measurement and each treated film was subjected to a test for the releasability and adhesion retention of a pressure-sensitive tape.

<Calculation of Surface Tension based on Contact Angle Measurement>

"CA-DT Type Contact Angle Measuring Device", manufactured by Kyowa Kaimen Kagaku K.K., was used as a measuring device, and water and hexadecane were used as liquids. The contact angles of each film with these liquids were measured, and the surface tension of the film was calculated from the found contact angle values using the following extended Fowkes equation.

$$(1+\cos\theta)\gamma_L = 2\sqrt{(\gamma_L^d \gamma_S^d)} + 2\sqrt{(\gamma_L^P \gamma_S^P)}$$

θ: Contact angle
$\gamma_L$: Surface tension of the liquid (known)
$\gamma_S$: Surface tension of the solid
$\gamma^d$: Component of dispersion force
$\gamma^P$: Component of polarity force In the above equation, the $\gamma_L^d$ and $\gamma_L^P$ of water are 21.8 dyne/cm and 51.0 dyne/cm, respectively, and the $\gamma_L^d$ and $\gamma_L^P$ of hexadecane are 27.6 dyne/cm and 0.0 dyne/cm, respectively.

<Test for Releasability and Adhesion Retention of Pressure-sensitive Tape>

"No. 31B" (width: 19 mm), manufactured by Nitto Denko Corp., was used as a pressure-sensitive tape. This pressure-sensitive tape was applied at room temperature with a 2-kg rubber roller to each polyester film on its surface which had undergone a release treatment (treatment for surface energy reduction). About 30 minutes after, the 180° peel strength of each sample was measured at a pulling rate of 300 mm/min to evaluate releasability from the film surface. Furthermore, each pressure-sensitive tape which had undergone this releasability test was applied to a stainless-steel plate with a 2-kg rubber roller and, at about 30 minutes thereafter, examined for 180° peel strength at a pulling rate of 300 mm/min to evaluate the-retention of adhesion of the pressure-sensitive tape.

The results of these tests are shown in Table 1 (calculation of surface tension based on contact angle measurement) and Table 2 (test for releasability and adhesion retention of pressure-sensitive tape). For reference, the test results for the untreated polyester film are also shown in Tables 1 and 2 under Reference Example 1.

TABLE 1

| | Contact angle (θ) | | Surface tension (dyne/cm) | | |
|---|---|---|---|---|---|
| | Water | Hexadecane | $\gamma_S$ | $\gamma_S^d$ | $\gamma_S^P$ |
| Example 1 | 78 | 6 | 35.0 | 27.5 | 7.5 |
| Example 2 | 76 | 6 | 35.9 | 27.5 | 8.4 |
| Example 3 | 88 | 22 | 29.5 | 25.6 | 3.9 |
| Example 4 | 84 | 22 | 31.0 | 25.6 | 5.4 |
| Example 5 | 78 | 8 | 34.8 | 27.3 | 7.5 |
| Example 6 | 100 | 78 | 14.7 | 10.1 | 4.6 |
| Example 7 | 98 | 8 | 28.3 | 27.3 | 0.9 |
| Example 8 | 98 | 24 | 26.5 | 25.3 | 1.2 |
| Example 9 | 96 | 6 | 28.8 | 27.5 | 1.3 |
| Reference Example 1 | 48 | 6 | 53.3 | 27.5 | 25.8 |

TABLE 2

| | Releasability (g/19-mm width) | Retention of adhesion (g/19-mm width) |
|---|---|---|
| Example 1 | 30 | 470 |
| Example 2 | 55 | 470 |
| Example 3 | 60 | 480 |
| Example 4 | 40 | 500 |
| Example 5 | 45 | 440 |
| Example 6 | 20 | 400 |
| Example 7 | 70 | 500 |
| Example 8 | 30 | 480 |
| Example 9 | 80 | 450 |
| Reference Example 1 | 460 | 410 |

The results shown in Table 1 show that the treatments for surface energy reduction conducted in Examples 1 to 9 were effective in considerably reducing the surface tension of the polyester film. The results shown in Table 2 show that due to the reduced surface tensions, not only the treated substrate surfaces had the improved ability to release a pressure-sensitive adhesive tape therefrom, but also the released adhesive tape had a high residual adhesive strength and showed satisfactory adhesion in reapplication.

As described above, according to the treatment method of the present invention, a durable layer having a low surface energy can be easily formed on a substrate surface. This treatment method produces excellent effects, for example, that an expensive special solvent such as those used in conventional techniques is unnecessary, and that a curing step which may cause mechanical damage to the substrate is also unnecessary.

While the invention has been described in detail and with reference to specific embodiments thereof, it will be apparent to one skilled in the art that various changes and modifications can be made therein without departing from the spirit and scope thereof.

What is claimed is:

1. A treatment method for surface energy reduction comprising:

coating a surface of a substrate with a first coating compound having a reactive functional group to form a coating on a substrate; and subjecting the coated substrate to an interfacial contact reaction with a second coating composition having at least one low-energy functional group and a reactive functional group that reacts with the functional group in the first coating compound;

wherein the low-energy functional group is at least one member selected from the group consisting of long-chain alkyl groups having 12 or more carbon atoms, perfluoro groups, and dimethylsiloxane groups;

wherein the reactive functional groups in the first and second coating compositions are selected from the group consisting of primary amino, secondary amino, isocyanate acid chloride, epoxy, vinyl, acid anhydride, carboxylic acid, aziridine, mercapto, hydrosilyl, and hydroxyl groups; and wherein the interfacial contact reaction between the reactive functional groups in the first and second coating compositions fixes the low-energy functional groups to the substrate surface thereby reducing the surface energy of the substrate surface.

2. The treatment method for surface energy reduction of claim 1, wherein a reactive intermediate layer is formed on the coated surface of the substrate beforehand so that the interfacial contact reaction is between the second coating composition and said reactive intermediate layer.

3. The treatment method for surface energy reduction of claim 2, wherein the interfacial contact reaction is a reaction between primary or secondary amino groups and isocyanate, acid chloride, epoxy, vinyl, or acid anhydride groups.

* * * * *

(12) REEXAMINATION CERTIFICATE (4465th)
United States Patent
Minamizaki

(10) Number: US 6,030,662 C1
(45) Certificate Issued: Oct. 16, 2001

(54) TREATMENT METHOD FOR SURFACE ENERGY REDUCTION

(75) Inventor: Yoshihiro Minamizaki, Ibaraki (JP)

(73) Assignee: Nitto Denko Corporation, Ibaraki (JP)

Reexamination Request:
No. 90/005,786, Aug. 8, 2000

Reexamination Certificate for:
Patent No.: 6,030,662
Issued: Feb. 29, 2000
Appl. No.: 09/129,036
Filed: Aug. 4, 1998

(30) Foreign Application Priority Data

Aug. 5, 1997 (JP) .................................... 9-211038

(51) Int. Cl.$^7$ ........................................ B05D 5/00
(52) U.S. Cl. .................... 427/333; 427/399; 427/400
(58) Field of Search .................... 427/333, 399, 427/400, 407.1

(56) References Cited

U.S. PATENT DOCUMENTS

| | | | |
|---|---|---|---|
| 4,539,061 | * 9/1985 | Sagiv | 427/407.1 |
| 5,435,839 | 7/1995 | Ogawa | 427/387 |

FOREIGN PATENT DOCUMENTS

| | | |
|---|---|---|
| 0 285 134 A2 | 10/1988 | (EP). |
| 2 224 274 A | 5/1990 | (EP). |
| 0 574 352 A1 | 6/1993 | (EP). |
| 0 903 387 A1 | 3/1999 | (EP). |
| WO 96/20796 | 7/1996 | (WO). |

OTHER PUBLICATIONS

Translation of JP02–279737, Nov. 1990.*
Database WPI Section Ch, Week 199841, Derwent Publications Ltd., London GB; Class A97, AN 1998–477009, XP002122062 and JP 10 204421 A (Matsushita Denki Sangyo KK), Aug. 4, 1998.

Database WPI, Section Ch, Week 199101, Derwent Publications Ltd., London, GB; Class A23, An 1991–003193, XP002122063 and JP 02 279737 A (NEOS.KK), Nov. 15, 1990.

Patent Abstracts of Japan, vol. 18, No. 401 (C–1231), Jul. 27, 1994 and JP 06 116429 A (Itochu Fine Chem KK; Others: 01), Apr. 26, 1994.

Database WPI, Section Ch, Week 199338, Derwent Publications Ltd., London, GB; Clas A81, An 1993–299729, XP002122060 and JP 05 214138 A (Central Glass Co., Ltd.), Aug. 24, 1993.

Database WPI, Section Ch, Week 199425, Derwent Publications Ltd., London, GB; Class A14, AN 1994–206369, XP002122061 and JP 06 145096 A (Shinetsu Chem. Ltd., May 24, 1994.

* cited by examiner

*Primary Examiner*—Erma Cameron

(57) ABSTRACT

A treatment method for surface energy reduction is disclosed, which comprises subjecting a substrate to an interfacial contact reaction between the phase thereof and a phase containing a compound having at least one low-energy functional group to fix the low-energy functional groups to the substrate surface to thereby reduce the surface energy thereof. The method necessitates neither an expensive special solvent nor a curing step causing mechanical damage to the substrate, and can be carried out under simple conditions.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–3, dependent on an amended claim, are determined to be patentable.

1. A treatment method for surface energy reduction comprising:

coating a surface of a substrate with a first coating compound having a reactive functional group to form a coating on a substrate; and subjecting the coated substrate to an interfacial contact reaction with a second coating composition having at least one low-energy functional group and a reactive functional group that reacts with the functional group in the first coating compound;

wherein the low-energy functional group is at least one member selected from the group consisting of long-chain alkyl groups having 12 or more carbon atoms, [perfluoro groups,] and dimethylsiloxane groups;

wherein the reactive functional groups in the first and second coating compositions are selected from the group consisting of primary amino, secondary amino, isocyanate acid chloride, epoxy, vinyl, acid anhydride, carboxylic acid, aziridine, mercapto, hydrosilyl, and hydroxyl groups; and wherein the interfacial contact reaction between the reactive functional groups in the first and second coating compositions fixes the low-energy functional groups to the substrate surface thereby reducing the surface energy of the substrate surface.

\* \* \* \* \*